United States Patent [19]
Jackson et al.

[11] 3,860,256
[45] Jan. 14, 1975

[54] RETRACTABLE TAG-AXLE ASSEMBLY FOR OVERLAND VEHICLES

[76] Inventors: William E. Jackson, 3726 Ernst St., Omaha, Nebr. 68112; James M. Becker, Rt. No. 1, Box 236A, Arlington, Nebr. 68002

[22] Filed: Feb. 14, 1974

[21] Appl. No.: 442,370

[52] U.S. Cl.......... 280/81 R, 180/24.02, 280/124 R
[51] Int. Cl............................................. B60g 17/00
[58] Field of Search ..................... 280/81 R, 124 R; 180/24.02

[56] References Cited
UNITED STATES PATENTS

| | | | |
|---|---|---|---|
| 3,093,388 | 6/1963 | Kulyk | 280/81 R |
| 3,285,621 | 11/1966 | Turner | 280/81 R |
| 3,390,895 | 7/1968 | Verdi | 180/24.02 X |
| 3,738,679 | 6/1973 | Jackson | 180/24.02 X |
| 3,740,071 | 6/1973 | Bilas | 280/124 R |
| 3,743,315 | 7/1973 | Bilas | 280/124 R |
| 3,771,812 | 11/1973 | Pierce et al. | 280/124 R |

FOREIGN PATENTS OR APPLICATIONS

| | | | |
|---|---|---|---|
| 568,630 | 11/1957 | Italy | 180/24.02 |
| 939,307 | 10/1963 | Great Britain | 180/24.02 |

Primary Examiner—Leo Friaglia
Attorney, Agent, or Firm—George R. Nimmer

[57] ABSTRACT

A dual-directional hydraulic piston of the casing and movable plunger type is utilized as a strategically located motive force both for the pressing means and the retraction means of the tag-axle assembly, which assembly is adaptable for installation within restricted confines of the vehicle and in close and independently actuatable relationship to any adjacent axle assembly.

9 Claims, 5 Drawing Figures

RETRACTABLE TAG-AXLE ASSEMBLY FOR OVERLAND VEHICLES

Drayage trucks and other overland cargo bearing vehicles are oftentimes discretionally provided with one or more additional transversely extending non-driven axles having rotatable wheels attached thereto. These additional axles are so-termed "non-driven" axles or "tag-axles" because they are wholly isolated from the driven-axles which are (unlike tag-axles) tied into the vehicle's power train. It is the primary purpose of such tag-axles to more evenly distribute the cargo weight along the vehicle frame lengthwise-axis, sometimes called the longitudinal-axis. Tag-axle assemblies normally require a longitudinally extending fulcrumed beam as the connection between a tandem-axle and the vehicle frame. For purposes when the vehicle is operated comparably devoid of cargo between payload trips, tag-axle assemblies need retraction means to lift the tandem-axle wheels sufficiently upwardly so as to clear the roadway thereby preventing undue tire wear. Moreover, tag-axle assemblies need pressing means to ensure sufficient downward pressure between the tag-axle wheels and the roadway to ensure that cargo weight is properly distributed among the several wheels of the vehicle. Air-bellows acting downwardly upon the elongate beam remote of its fulcrum connection to the vehicle are conventional pressing means. Tag-axle assemblies need some type of cushioning means so that the firmly downwardly pressed tandem-axle wheels are in resilient contact with the roadway; leaf-spring type beams, air-bellows pressing means, and auxiliary shock absorbers are traditionally employed, either individually or in combination, for the cushioning means.

The retraction means component of tag-axle assemblies tends to be the most troublesome and complicated portion. It is the formidable task of the retraction means to lift the tandem-axle and wheels weighing on the order of 1,000 pounds through a vertical distance of twelve inches or more. For example, the air-bellows type pressing means, while being advantageous in being readily attachable to the vehicle frame and to the elongate beam and for providing a degree of cushioning means, is not structurally capable of functioning too as a retraction means. Hence, prevalent types tag-axle assemblies utilizing the common air-bellows pressing means need to be provided with separate and oftentimes complicated retraction means.

It is accordingly the general object of the present invention to provide improved retractable tag-axle assemblies which are readily installable as an addendum accessory to overland vehicles of various types and including those having only restrictive available space for the tag-axle. It is an ancillary general object to provide tag-axle assemblies which can be located in exceedingly close longitudinal spacing between adjacent (and yet wholly independently operatable tag-axle assemblies.

It is another general object of the present invention to provide retractable tag-axle assemblies wherein the same motive member is utilized both for the pressing means and the retraction means, while maintaining adequate cushioning means, and without sacrificing the required lifting amplitude thereby simplifying the overall tag-axle assembly.

With the above and other objects and advantages in view, which will become more apparent as the description proceeds, the retractable tag-axle assembly for overland vehicles generally comprises an elongate longitudinally extending springy-beam having its leading portion pivotably attached at a constant elevation fulcrum through a hanger member depending from the vehicle frame and transversely offset from the vehicle longitudinally extending lengthwise-axis, said springy-beam having its trailing portion at a trail-site attachably associated with the transversely extending tandem-axle whereby the springy-beam has a finite overall-length between its fulcrum and trail-site; a preferably uprightly positioned hydraulically actuatable piston of the double-acting dual-components extendable plunger and casing type with one component being pivotably attached to the vehicle frame above the springy-beam and the other component being pivotably associated with the springy-beam at a medial-pivot located a minimal offset-length from the fulcrum toward the trail-site whereby the springy-beam overall-length bears a thrust-ratio of at least three compared to the offset-length; and control means located at the vehicle operator's station and remote from the springy-beam for forceably introducing hydraulic motive fluid into the piston casing component for forceably extending or withdrawing the plunger component as a pressing means and as a retractor means, respectively, for the tandem-axle.

In the drawing, wherein like characters refer to like parts in the several views, and in which:

FIG. 4 is a sectional plan view looking downwardly and taken along lines 4—4 of FIGS. 2 and 3.

FIG. 5 is a schematic view directed to the dual-directional piston and remotely controlled actuation means therefor.

Figure 1:
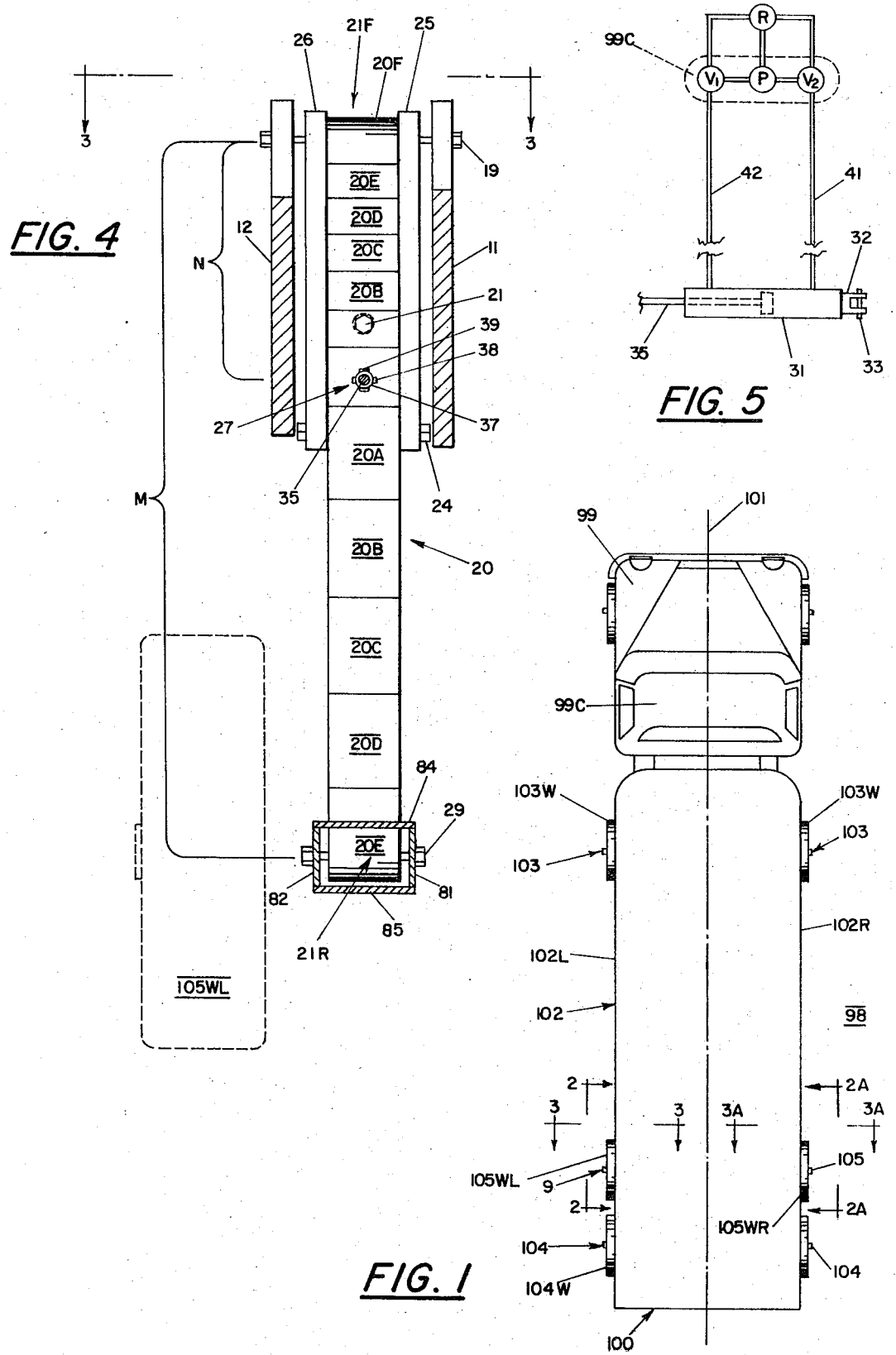
FIG. 1 is a top plan view of a typical cargo bearing overland vehicle extending longitudinally along a lengthwise-axis, the top plan view serving primarily to show a typical environment for the retractable tag-axle assembly of the present invention and to provide a basis for the following sectional views.

The teachings of the present invention are adaptable for cargo bearing vehicles generally, so long as there is included therewith at least one transversely extending so-called non-driven or tag-axle. For example, the FIG. 1 typical environment arbitrarily selected is a semi-trailer vehicle comprising a forwardly disposed self-propelled tractor 99 having an operator's cab or station 99C, the tractor 99 being adapted to pull therebehind a trailer 100 extending longitudinally along a lengthwise-axis 101. Trailer 100 herein with a horizontal floor frame 102 has three sets of horizontal axles each transversely intersecting that imaginary vertical centerplane passing along lengthwise-axis 101. Trailer floor bed 102 has two longitudinally extending faces 102L and 102R, located on opposite lateral sides of 101. Each of said three axles is provided with at least two wheels located on respective lateral sides of the centerplane 101 for contacting a suitable underlying substrate, e.g. roadway 98. For example, typical trailer 100 has a basic underlying support two sets of so-called primary-axles or driven-axles including front-axle 103 having rubber tire wheels 103W and also including a rear-axle 104 having rubber tires 104W. The third axle shown as 105 (having rubber tires 105WL and 105WR) is located between axles 103 and 104. Member 105 is the tandem-axle portion of the overall retractable non-driven or tag-axle assembly, e.g. embodiment 9, of the present invention.

Figure 2:
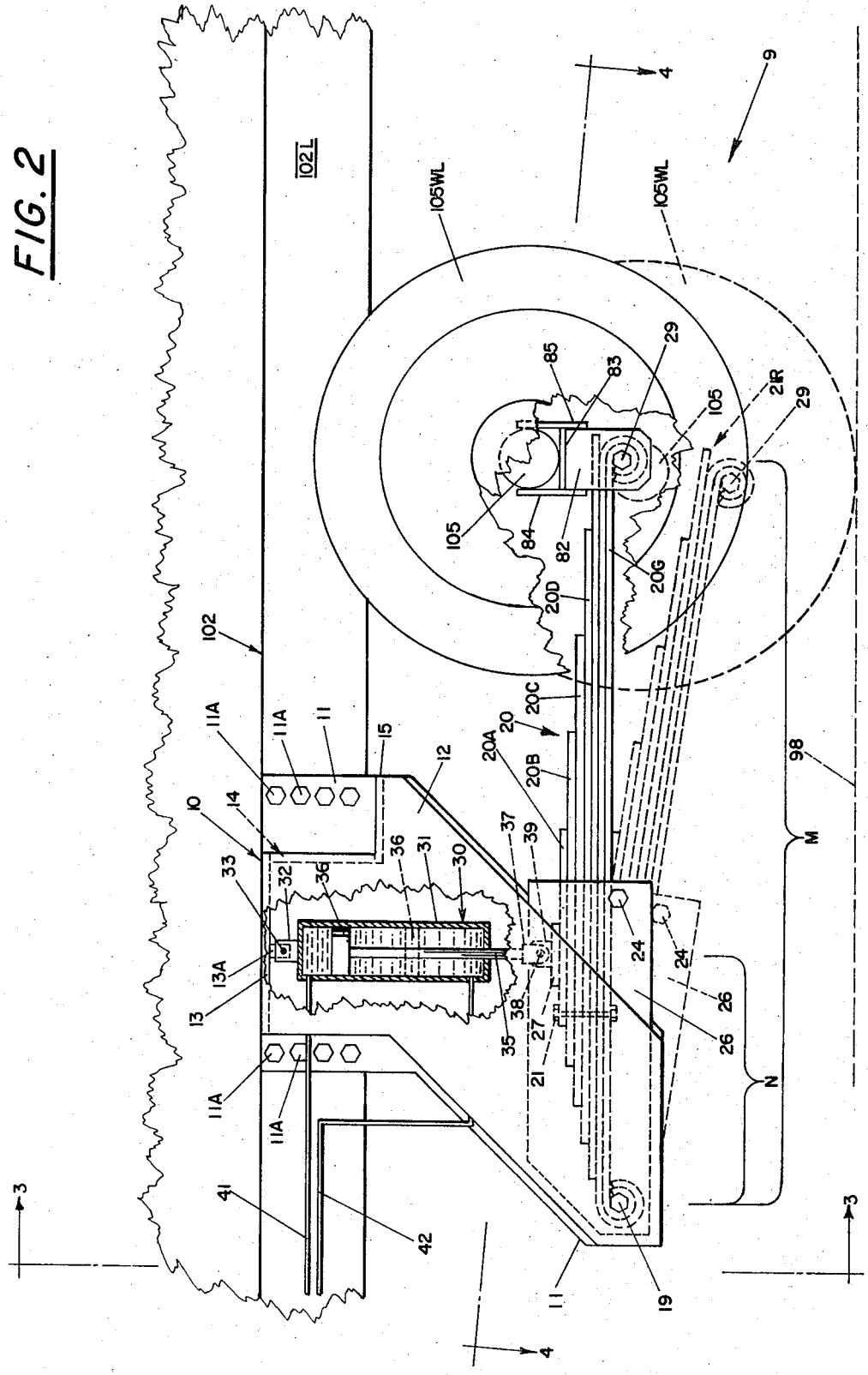
FIG. 2 is a sectional elevational view taken along lines 2—2 of FIGS. 1 and 3, FIG. 2 being a substantial mirror image of a sectional elevational view (not shown) taken along line 2A—2A of FIG. 1.
Figure 3:
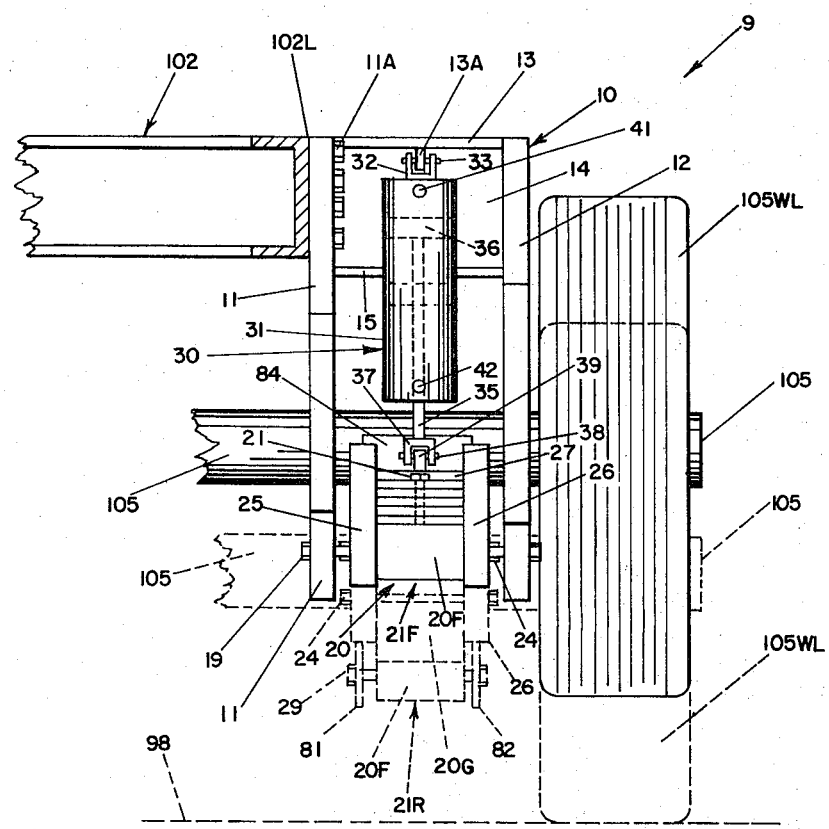
FIG. 3 is a sectional elevational view taken along lines 3—3 of FIGS. 1 and 2, which is a substantial mirror image of a view (not shown) taken along line 3A—3A of FIG. 1.

Turning now to FIGS. 2-4 for a detailed explanation of a typical embodiment 9 of the retractable tag-axle assembly concept for the present invention it being indicated by section lines 2A—2A and 3A—3A that embodiment 9 is of like construction on the two lateral sides of lengthwise-axis 101. For example, assembly 9 on each side of lengthwise-axis 101 comprises: a leading frontal hanger 10 including a transversely extending fulcrum 19 maintained at constant elevation by hanger 10, a longitudinally extending elongate springy-beam (e.g., 20) having its leading portion 21F pivotably attached to fulcrum 19, the springy-beam 20 at a trail-site 29 longitudinally rearwardly remote of fulcrum 19 being associated with tandem-axle 105, a hydraulically actuatable piston 30 of the casing and double-acting extendable plunger components type lying uprightly alongside hanger 10 with the piston components being respectively pivotably attached to the stationary framework (e.g., hanger 10) and to the springy-beam much nearer the fulcrum 19 than to its trail-site 29. The piston 30 effects (pressing and retracting) upon springy-beam 20 through casing hosing 41 and 42 are controllably actuated remotely from assembly 9 as from operator's cab 99C. In describing and claiming herein the 9 and other suggested embodiments for the retractable tag-axle assemblies, the terms "forward" and "rearward" refer directionally longitudinally toward the "leading" (i.e. fulcrum 19) and toward the "trailing" (i.e. trailsite 29) portions, respectively. This nomenclature is necessary because the retractable tag-axle assembly is sometimes employed in longitudinal reversal, i.e. with the trail-site and tandem-axle being located nearer to tractor 99 than is the springy-beam fulcrum 19.

A typical frontal hanger embodiment 10 for assembly 9 comprises a pair of opposed upright sturdy plates including outboard-plate 12 and inboard-plate 11 which directly abuts the trailer floor longitudinally extending face (e.g. 102L) and herein removably attached to bed 102 with bolts 11A. Lateral spacing between inboard-plate 11 and outboard-plate 12 is herein rigidly maintained with a pair of transversely extending spacer-members attached (as by welding) to plates 11 and 12 including horizontal top-spacer 13 and shelf-spacer 15 and also including vertical rear-spacer 14. Herein, the term "stationary framework" is defined to mean the vehicle body (e.g., floor panel 102) together with rigidly attached appurtenances thereof (e.g., dual-plates hanger 10). The constant elevation fulcrum 19 herein comprises a horizontal stud passing transversely through the two depending plates 11 and 12.

For elongate longitudinally extending springy-beam having its leading portion 21F pivotably connected to the constant elevation fulcrum 19, an elongate metallic bar singularly constructed of semirigid springy metal might be employed. However, the springy-beam 20 herein employed is of the plural-leaves leaf-spring type, such as comprising seven springy-leaves 20A–20G in stacked form. The seven stacked leaves are maintained in stacked abutting relationship with a bolt 21 loosely vertically passing through the several horizontal springy leaves 20A–20G. Through the loosely fitting stiffening-means bolt 21, the entire multi-leaves structure 20 is permitted to flex, progressively increasingly toward the springy-beam trailing portion 20R. Also, the upper four leaves 20A–20D are of progressively shorter longitudinal lengths. The springy-beam leading portion 21F is pivotably connected to constant elevation fulcrum 19, herein lowermost leaves 20F and 20G being permanently bendably formed about and rotatably surrounding bolt fulcrum 19. The springy-beam trailing portion 21R is associated with the tandem-axle 105, herein lowermost leaves 20F and 20G being permanently bendably formed about a horizontal stud 29. It can be seen that the springy-beam has a longitudinally extending overall-length "M" between its fulcrum-site 19 and its trail-site 29.

The means herein employed for attaching the springy-beam trailing portion to the tandem-axle 105 comprises a pair of laterally separated upright faceplates 81 and 82 through which stud 29 transversely passes. Rigidly maintaining the lateral spacing of faceplates 81 and 82, as by welding thereto, are upright front-plate 84, upright rearplate 85, and horizontal shelf-plate 83. The three plates 83–85 (together forming a saddle) are respectively tangent to tandem-axle 105 and are attached thereto as by welding each plate at its tangential location. It can be seen that the gravitational force comprising the weight of the tandem-axle 105 and attached wheels 105WL and 105WR causes the springy-beam to pivot downwardly about fulcrum 19 and toward roadway substrate 98. However, as will be pointed out later in greater detail both the lifter-bar 24 which passes transversely through upright sideplates 25 and 26 immediately below lowermost springy leaf 20G and the hydraulic piston 30 are adapted to resist said gravitational force and prevent wheels 105WL and 105WR from attaining substrate 98.

For the pressing means portion of the retractable tandem-axle assembly, a dual-directional hydraulically powered upright piston (e.g., 30) the type having casing (e.g., 31) and extendable plunger (e.g., 35) components are preferred. The respective piston components are pivotably attached to the vehicle framework and to the springy-beam at a medial-pivot located between the fulcrum-site and the trail-site 29. However, the medial-pivot 38 is located a minimal offset-length "N" longitudinally from the fulcrum-site whereby the springy-beam overall-length "M" bears a leverage-ratio or thrustratio of at least three as compared to the offset-length "N." As the piston plunger 35 is forced to extend outwardly from piston casing 31, and bears downwardly against the springy-beam 20, the sole downward pressing means for tandem-axle 105 (and wheels 105WL and 105WR) is attained (phantom line in FIGS. 2 and 3). However, tandem-axle retraction is solely effected whenever the plunger 35 is forced to withdraw into casing 31, as indicated in solid line in FIGS. 2 and 3.

For assembly embodiment 9, piston casing 31 is located between depending framework plates 11 and 12, the butt-end ears 32 of casing 31 being pivotably attached to the vehicle framework with a horizontal pivot-pin 33 passing through ears 32 and an intervening lug 13A depending from stationary top-spacer 13. A pair of hoses 41 and 42 for forceably introducing and exhausting hydraulic motive fluid pass through casing 31. The plunger 35 having head 36 slidably reciprocating associated within casing 31 has a clevis 37 as its fore-end. "Down-hose" 41 (for initiating pressing means) communicates with casing 31 above the permitted positions for plunger head 36, and "up-hose" 42 (for effecting retraction means) communicates with casing 31 below the permitted positions for plunger head 36. Herein, medial-pivot "M" comprises a horizontal pivot-pin 38 passing through plunger fore-end 37 and intervening boss 39. Boss 39 is rigidly attached to and extends upwardly from a horizontal roof-plate 27 which abuttably overlies uppermost spring leaf 20A and which is attached as by welding to the respective side-plates 25 and 26 for maintaining a fixed lateral distance therebetween. Side-plates 25 and 26 flank the opposite lateral sides of multi-leaves springy-beam 20, fulcrum 19 passing transversely through side-plates 25 and 26 as well as through hanger plates 11 and 12 and lowermost springy leaves 20F and 20G.

Referring now to the FIG. 5 schematic view. The position of plunger head 36 within casing 31, and hence the effect of plunger 35 upon springy-beam 20 and tandem-axle 105, depends upon through which hose 41 or 42 hydraulic fluid is forced into piston casing 31. Apt control means, such as three-way valves V1 and V2, located within the operator's station 99C is employed to govern the flow of hydraulic motive fluid from reservoir "R" through pump "P" and thence through a selected hose 41 or 42.

It can be appreciated that the tag-axle assembly, e.g. 9, is readily adapted both for original equipment form and as an addendum accessory for many kinds of existing vehicular equipment. The assembly 9 is sufficiently compact to permit very close longitudinal spacing of immediately adjacent and wholly independent axle assemblies on the same vehicle, and yet is very efficient from the leverage-ratio sense relative to the springy-beam 20 as both pressing means and retraction means.

From the foregoing, the construction and operation of the retractable tag-axle assemblies for overland vehicles will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

We claim:

1. In combination with a longitudinally extending overland vehicle having an operator's station and including at least one transversely extending non-driven so-called tandem-axle carrying at least one revolvable depending wheel located on each lateral side of the vehicle lengthwise-axis, said improved tag-axle assembly including upward retraction means and downward pressing means for the tandem-axle and comprising on each lateral side of the vehicle lengthwise-axis:
   A. An elongate longitudinally extending springy-beam having its leading portion pivotably attached to a fulcrum maintained at constant elevation by a hanger member depending from the vehicle main frame, said springy-beam having its trailing portion at a trail-site attachably associated with the transversely extending tandem-axle whereby the springy-beam has a finite overall-length measured from fulcrum to trail-site and whereby the gravitational force comprising the combined weights of the tandem-axle and rotatable wheels cause the beam to pivot downwardly about the fulcrum;
   B. An elongate piston of the casing and double-acting plunger components type, one said piston component being pivotably attached to the vehicle frame above said elongate springy-beam and the other said piston component being ultimately pivotably associated with the springy-beam at a medial-pivot location situated a minimal offset-length longitudinally from the fulcrum toward the trail-site whereby the springy-beam overall-length bears a thrust-ratio of at least three with respect to said offset-length; and
   C. Control means located at the operator's station for forceably introducing motive fluid into the double-acting piston to govern the length thereof whereby the tandem-axle wheels are selectably pressed downwardly against and retracted upwardly from the vehicle underlying substrate and solely by virtue of the piston elements within the same tag-axle assembly.

2. The combination of claim 1 wherein the springy-beam at said trail-site is pivotably associated with the said transversely extending tandem-axle; wherein the double-acting piston is uprightly positioned having its casing as the piston upper component and pivotably associated with the vehicle frame; wherein the double-acting piston has its withdrawable-extendable plunger as the lower component thereof and pivotably associated with the springy-beam at said medial-pivot; and wherein liquid motive fluid controllably suppliable from a suitable reservoir is utilized for forceable introduction through either of a pair of hoses leading into the piston casing for respectively withdrawing and extending the movable piston with respect to the piston casing.

3. The combination of claim 2 wherein the elongate springy-beam is of the multi-leaves type and including stiffening-means located at the beam leading portion whereby the multi-leaves springy-beam is progressively more flexible from the leading portion toward the trailing portion thereof; and wherein the upright piston casing is pivotably associated with said hanger member frame addendum.

4. The combination of claim 3 wherein the multi-leaves springy-beam comprises elongate stacked springy-leaves that are individually lengthier toward the springy-beam lower-side, at least the lowermost springy-leaf having terminal portions wrapped around the fulcrum and also the trail-site said pivotal connections.

5. The combination of claim 4 wherein there is an underlying lifter-bar at the springy-beam lower-side and located between the medial-pivot and the trail-site and nearer the said medial-pivot, said lifter-bar being attached to the assembly whereby upward withdrawal of the movable plunger into the piston casing ensures that the attached springy-beam will upwardly retract the tandem-axle through its said pivotal connection at the trail-site.

6. The combination of claim 5 wherein there is a pair of opposed side-plates for housing the springy-beam leading portion, the fulcrum as a stud passing transversely through said side-plates and the depending hanger member, the plunger medial-pivot connection being attached to said springy-beam through said side-plates, and said lifter-bar transversely passing through said side-plates and in trailing relationship to the depending hanger member.

7. The combination of claim 6 wherein the vehicle frame includes a pair of longitudinally extending upright faces; wherein each depending hanger member is of opposed dual-plates configuration including an inboard-plate attached in depending and abutting relationship to the frame face, the piston casing component being pivotably attached to the hanger member between the two plates thereof; wherein the side-plates housing for the springy-beam leading portion is located between the hanger depending plates and below the piston casing; wherein the trail-site pivotal connection between the springy-beam and the tandem-axle comprises a saddle for the tandem-axle and attached to the springy-beam; and wherein the thrust-ratio is at least four.

8. The combination of claim 2 wherein the double-acting piston has its withdrawable-extendable plunger as the lower component thereof and pivotably associated at the medial-pivot with the springy-beam; wherein liquid motive fluid supplied from a suitable reservoir is utilized for the forceable introduction into the respective casing hoses; wherein the elongate springy-beam is of the multi-leaves type and including stiffening-means located at the leading portion thereof whereby the multi-leaves type springy-beam is progressively more flexible toward the trailing portion thereof; and wherein there is an underlying lifter-bar for the multi-leaves springy-beam and located between the medial-pivot and the trail-site and nearer said medial-pivot, said underlying lifter-bar being aptly integrated into the tag-axle assembly whereby upward withdrawal of the movable plunger into the piston casing ensures that the springy-beam will cause upward retraction of said tandem-axle through its said pivotal connection with the springy-beam.

9. The combination of claim 8 wherein there is a pair of opposed side-plates for housing the springy-beam leading portion, the fulcrum as a transversely extending stud passing through the opposed side-plates, the hanger member, and through permanently bent leaves of the springy-beam; wherein said lifter-bar passes transversely through the opposed side-plates in trailing relationship to the hanger member; and wherein the trailing connection between the springy-beam and the tandem axle comprises a saddle attached to the tandem-axle, opposed face-plates attached to and depending from said saddle, and a transversely extending stud passing through the depending face-plates and pivotably passing through the springy-beam at the trail-site thereof.

* * * * *